United States Patent
Au et al.

(10) Patent No.: US 7,668,561 B2
(45) Date of Patent: Feb. 23, 2010

(54) APPARATUS AND METHOD FOR CONTROLLING REVERSE LINK INTERFERENCE AMONG ACCESS TERMINALS IN WIRELESS COMMUNICATIONS

(75) Inventors: Jean Put Ling Au, San Diego, CA (US); Christopher Gerard Lott, San Diego, CA (US); Naga Bhushan, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 10/789,516

(22) Filed: Feb. 27, 2004

(65) Prior Publication Data

US 2005/0192042 A1 Sep. 1, 2005

(51) Int. Cl.
*H04B 7/00* (2006.01)
(52) U.S. Cl. .......................... 455/522; 455/69
(58) Field of Classification Search ............... 455/11.1, 455/68, 69, 517, 522
See application file for complete search history.

(56) References Cited

U.S. PATENT DOCUMENTS

| | | | |
|---|---|---|---|
| 3,824,597 A * | 7/1974 | Berg | 370/215 |
| 5,734,967 A * | 3/1998 | Kotzin et al. | 455/63.1 |
| 6,147,815 A | 11/2000 | Fujie | |
| 6,317,600 B1 | 11/2001 | Salonaho et al. | |
| 6,577,875 B1 | 6/2003 | Brouwer | |
| 6,643,520 B1 * | 11/2003 | Park et al. | 455/522 |
| 6,731,620 B1 * | 5/2004 | Lim et al. | 370/335 |
| 2004/0121808 A1 * | 6/2004 | Hen et al. | 455/561 |
| 2005/0026624 A1 | 2/2005 | Gandhi et al. | |

FOREIGN PATENT DOCUMENTS

| WO | 98027777 | 6/1998 |
|---|---|---|
| WO | 05094112 | 10/2005 |

OTHER PUBLICATIONS

"3rd Generation Partnership Project 2 '3GPP2' CDMA2000 High Rate Packet Data Air Interface Specification," 3GPP2 C.S0024 Version 3.0, Dec. 5, 2001.
International Search Report, PCT/US2005/004981, International Search Authority-EPO, Jun. 15, 2005.
European Search Report-EP08001199, Search Authority-Berlin-Mar. 26, 2008.
International Preliminary Examination Report - PCT/US05/004981, IPEA - US, Mar. 29, 2007.
Written Opinion, PCT/US05/004981, International Search Authority-EPO, Jun. 15, 2005.

* cited by examiner

*Primary Examiner*—Quochien B Vuong
(74) *Attorney, Agent, or Firm*—Kent D. Baker; Rupit M. Patel (57) ABSTRACT

In a wireless communication system, an apparatus and a method are provided for controlling reverse link interference among access terminals that are power controlled by a sector of a base station. In an embodiment, the maximum effective noise power spectral density is used as a parameter for controlling the level of reverse link loading, by setting a reverse activity bit (RAB) to signal the access terminals to reduce their data rates in order to minimize interference between the access terminals if the maximum effective noise power spectral density is above a predetermined threshold.

57 Claims, 3 Drawing Sheets

APPARATUS AND METHOD FOR CONTROLLING REVERSE LINK INTERFERENCE AMONG ACCESS TERMINALS IN WIRELESS COMMUNICATIONS

BACKGROUND

1. Field

The present invention relates generally to telecommunications, and more specifically, to controlling reverse link interference in telecommunications.

2. Background

In a typical telecommunications network based on the CDMA 2000 1xEV-DO standard according to "3rd Generation Partnership Project 2 '3GPP2 ' CDMA2000 High Rate Packet Data Air Interface Specification," 3GPP2 C.S0024 Version 3.0, Dec. 5, 2001, the control of loading of reverse link traffic from mobile stations or access terminals to a base station is determined by a parameter known as the rise-over-thermal (ROT) ratio.

The reverse links of a CDMA 2000 1xEV-DO system are code division multiplexed (CDM) and are therefore interference limited. In an interference-limited CDM communication system, the reverse link transmission of each access terminal is an interference to other access terminals. An access terminal can transmit at a higher data rate if the interference level from other access terminals is lower. Furthermore, if one of the access terminals transmits at a higher data rate, other access terminals may experience more interference from the access terminal transmitting at the higher data rate.

It is desirable to achieve three major goals in the design of a CDM network, namely, to maximize the overall throughput of the network within any given sector of a base station, to maintain stable reverse link operations, and to ensure coverage at the edge of the network. However, these goals tend to conflict with one another and achieving these goals simultaneously typically requires delicate control of loading within the network.

In many practical situations, the ROT ratio may not be the best indicator of sector loading and may not be relied upon as the sole parameter for controlling the loading of reverse link traffic in order to minimize reverse link interference among the access terminals while providing an adequate data throughput in a wireless communication system. Therefore, there is a need in the art for a new scheme for controlling reverse link loading in a wireless communication system.

SUMMARY

Embodiments disclosed herein address the above stated needs by implementing an apparatus and a method in which a maximum effective noise power spectral density is used as a parameter for controlling reverse link interference, by setting a reverse activity bit (RAB) to signal access terminals to reduce their data rates if the maximum effective noise power spectral density is above a predetermined threshold.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A high data rate (HDR) subscriber station, referred to herein as an access terminal (AT), may be mobile or stationary, and may communicate with one or more HDR base stations, also known as modem pool transceivers (MPTs). An access terminal transmits and receives data packets through one or more modem pool transceivers to an HDR base station controller, also known as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more base stations is called an active access terminal, and is said to be in a traffic state. An access terminal that is in the process of establishing an active traffic channel connection with one or more base stations is said to be in a connection setup state. An access terminal may be any data device that communicates through a wireless channel or through a wired channel, for example, using fiber optic or coaxial cables. An access terminal may further be any of a number of types of devices including but not limited to a PC card, a compact flash, an external or internal modem, or a wireless or wireline phone. The communication link through which an access terminal sends signals to a base station is called a reverse link. The communication link through which a base station sends signals to an access terminal is called a forward link.

Exemplary embodiments are described below with reference to the reduction of reverse link interference in a wireless communication system according to the CDMA 2000 1xEV-DO Rev-A standard, known as the "3rd Generation Partnership Project 2 '3GPP2' CDMA2000 High Rate Packet Data Air Interface Specification." However, the present invention is applicable to the reduction of reverse link interference in various types of CDMA communication systems.

Figure 1:
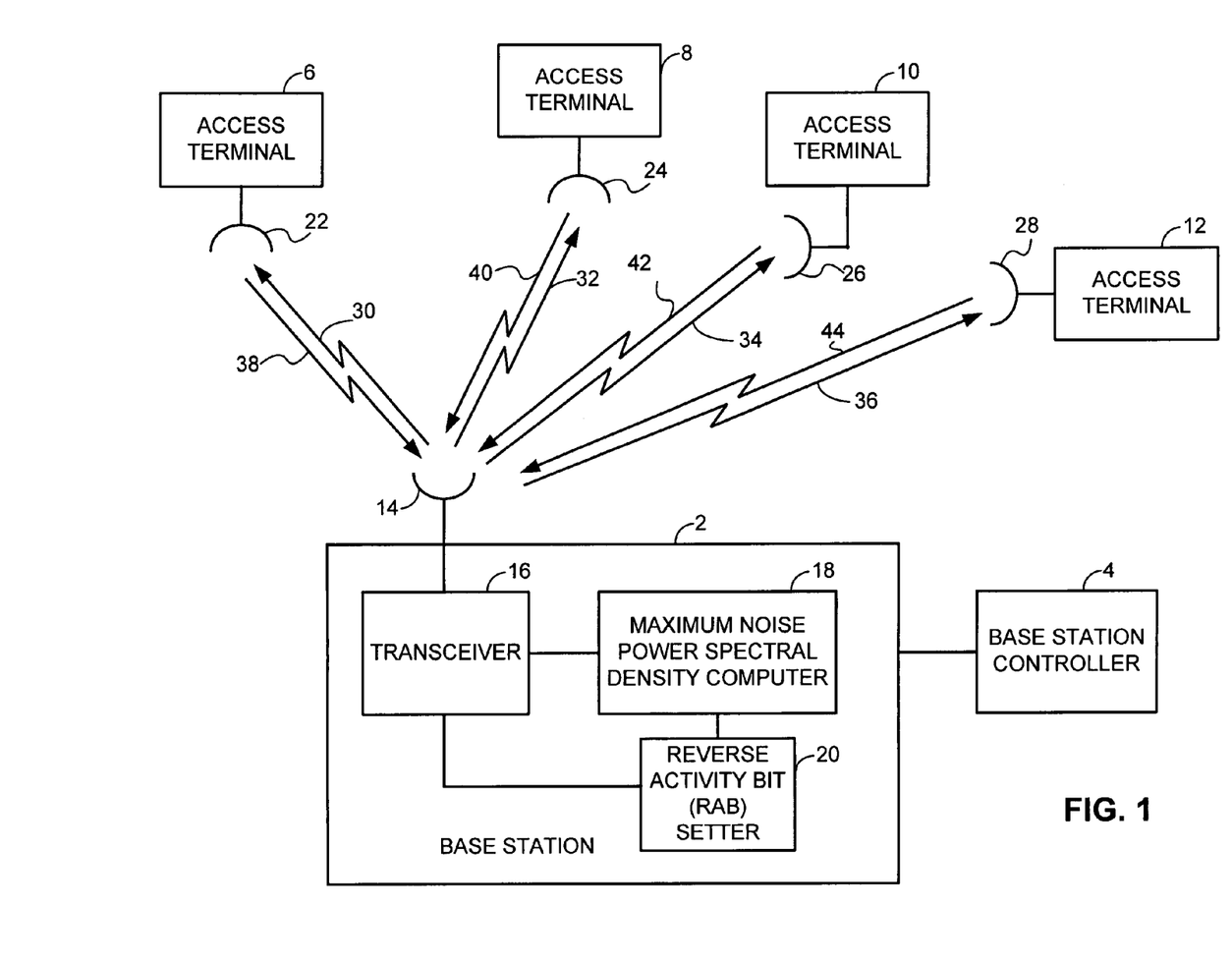
FIG. 1 is a simplified block diagram of a wireless communication system in which embodiments of the present invention may be implemented.

FIG. 1 is a simplified block diagram of a wireless communication system which includes a base station 2, a base station controller 4 connected to the base station 2, and a plurality of access terminals 6, 8, 10 and 12 communicating with the base station 2. The base station 2 includes at least one antenna 14, a transceiver 16 connected to the antenna 14, a computer 18 connected to the transceiver 16 for computing a maximum effective noise power spectral density among the access terminals, and a reverse activity bit (RAB) setter 20 connected to the maximum effective noise power spectral density computer 18 and the transceiver 16. The base station 2 may also include various other components of a typical CDMA system not explicitly shown in FIG. 1 but known to a person skilled in the art.

The base station 2 may transmit signals to antennas 22, 24, 26 and 28 of the access terminals 6, 8, 10 and 12 through forward links 30, 32, 34 and 36 and receive signals from the access terminals through reverse links 38, 40, 42 and 44, respectively. For the purpose of simplifying the illustration, FIG. 1 shows only one sector antenna 14 associated with the base station 2, although a typical base station may have several antennas covering all sectors of a cell, and each sector antenna may communicate with a plurality of access terminals simultaneously. Furthermore, some of the access terminals 6, 8, 10 and 12 may not necessarily be located within the same sector. An access terminal outside a given sector of a base station may transmit at a sufficiently high power level and contribute significantly to the loading of the given sector, thereby resulting in increased interference for other access terminals that include the given sector in their active sets. A base station may include a plurality of sectors covered by different antennas, or may include only one sector with 360° coverage by an omni-directional antenna.

Figure 2:
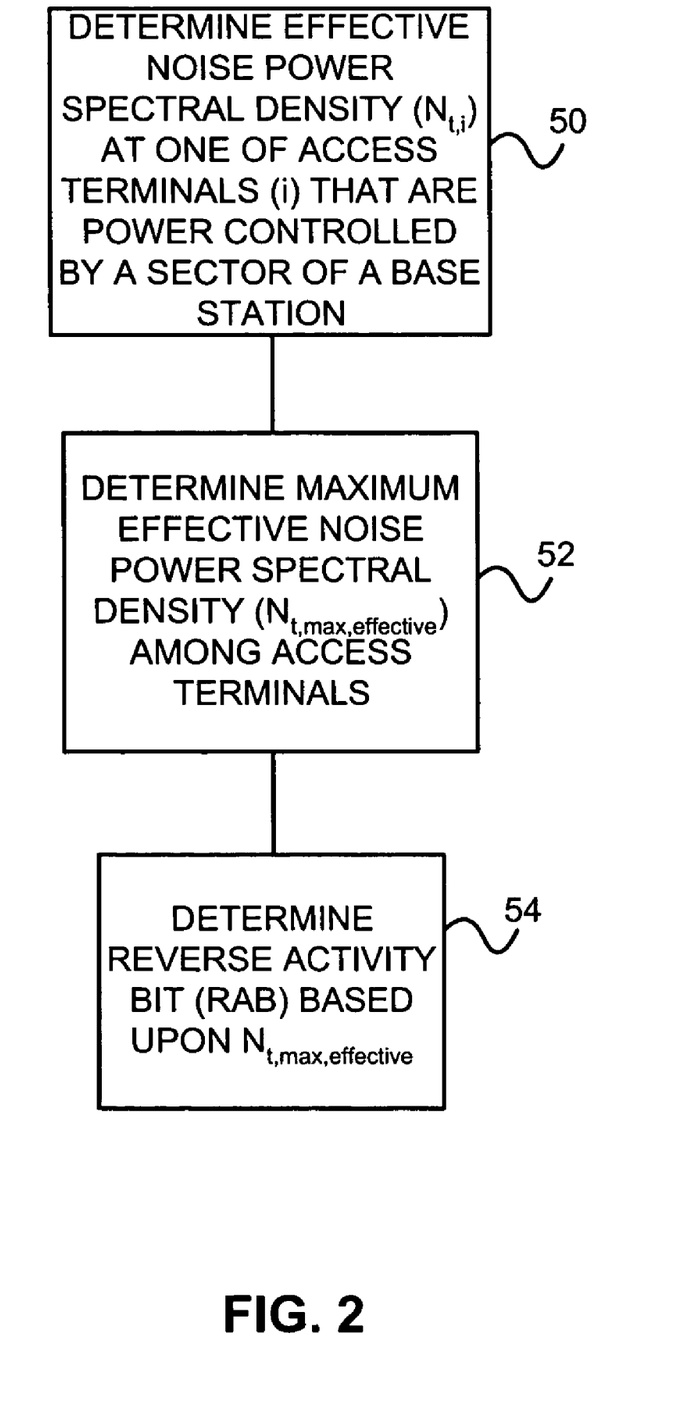
FIG. 2 is a flowchart illustrating an embodiment of process steps in a method for controlling reverse link loading based upon the maximum effective noise power spectral density according to the present invention.

FIG. 2 is a flowchart illustrating an embodiment of controlling reverse link loading based upon the maximum effective noise power spectral density according to the present invention. As illustrated in FIG. 2, the effective noise power spectral density at each of the access terminals that are power controlled by a given sector of the base station is determined as indicated by block 50. In an embodiment, the control of reverse link loading is achieved by using a maximum noise spectral density ($N_{t,max}$) without pilot interference cancellation (PIC). If pilot interference cancellation is not implemented, the relationship of the noise power spectral density ($N_{t,i}$) of a given access terminal (i) to the thermal noise power spectral density ($N_0$) and interference from other access terminals that contribute significantly to the loading of the sector of the base station is given by equation (1) as follows:

$$N_{t,i} = I_0 - E_{c,i} = N_0 + \sum_{j \neq i} (E_{cp,j} + E_{c,overhead,j} + E_{c,traf,j}) \quad (1)$$

where $N_{t,i}$ is the noise power spectral density of the access terminal i, $I_0$ is the total received power spectral density at the base station, $E_{c,i}$ is the chip energy of the access terminal i, $N_0$ is the thermal noise power spectral density, $E_{cp,j}$ is the pilot chip energy of the jth access terminal, which is another access terminal other than the access terminal i itself, and $E_{c,overhead,j}$ is the chip energy of the overhead channels of the jth access terminal. In an embodiment, the overhead channels include a data request channel (DRC) and an acknowledgement channel (ACK). In another embodiment, the overhead channels further include a reverse rate indicator (RRI) channel and an auxiliary pilot channel. The chip energy $E_{c,overhead,j}$ is the total chip energy of all overhead channels. In equation (1), $E_{c,traf,j}$ is the chip energy of the traffic channels of the jth access terminal. Therefore, the noise power spectral density ($N_{t,i}$) at the access terminal i is the sum of the thermal noise power spectral density $N_0$ and the interference due to transmissions by other access terminals, that is, the sum of the chip energy of channels including traffic channels, overhead channels and pilot channels of other access terminals. The chip energy of the channels of the access terminal i itself is not considered in the calculation of the noise power spectral density $N_{t,i}$ at the access terminal i.

In an embodiment in which pilot interference cancellation is not implemented at the base station, an access terminal with the minimum chip energy ($E_{c,min}$) is selected from the access terminals that are deemed to contribute a significant load to the sector, and the total received power spectral density ($I_0$) at the base station is measured. The maximum noise power spectral density ($N_{t,max}$) is computed according to equation (2) as follows:

$$N_{t,max} = I_0 - E_{c,min} \quad (2)$$

In an embodiment, the ratio of the noise power spectral density to the thermal noise power spectral density ($N_{t,i}/N_0$) is computed for each of the access terminals.

In another embodiment, control of reverse link loading is achieved by using a maximum effective noise spectral density ($N_{t,max,effective}$) with pilot interference cancellation (PIC). In a system in which pilot interference cancellation is implemented, the interference experienced by an access terminal may be lower because the base station is able to cancel interference from the pilot channels of some or all of the access terminals that are being power controlled by a particular sector of the base station. With pilot interference cancellation, the effective noise spectral density ($N_{t,i,effective}$) at access terminal i is given by equations (3) and (4) as follows:

$$N_{t,i,effective} = N_0 + \sum_{\substack{j \neq i \\ j \notin A_c}} E_{cp,j} + \sum_{\substack{j \neq i \\ j \in A_c}} (1 - a_j) * E_{cp,j} + \sum_{j \neq i} (E_{c,overhead,j} + E_{c,traf,j}) \quad (3)$$

$$N_{t,i,effective} = I_0 - E_{c,i} - \sum_{\substack{j \neq i \\ j \in A_c}} a_j * E_{cp,j} \quad (4)$$

where $A_c$ is a set of access terminals whose pilot channels can be canceled by the base station. In an embodiment, the set $A_c$ comprises some or all of the access terminals that are power controlled by the particular sector of the base station. In an embodiment, not all the pilot channels of the access terminals within the set $A_c$ are interference canceled, and $a_j$ is a fraction of the number of access terminals which are within the set $A_c$ and whose pilot channels are canceled by the base station. In this embodiment, the overhead channels such as DRC channels, ACK channels, RRI channels or auxiliary pilot channels of the access terminals in the set $A_c$ are not canceled by the base station. In another embodiment, other reverse link channels including one or more data channels of one or more access terminals that are power controlled by the base station can be canceled.

After the effective noise power spectral densities at the access terminals are determined, the maximum effective noise power spectral density ($N_{t,max,effective}$) among these access terminals is selected among the access terminals as indicated by block 52 in FIG. 2. In an embodiment, the ratio of the maximum effective noise power spectral density to the thermal noise power spectral density ($N_{t,max,effective}/N_0$) is chosen as the parameter for determining whether the reverse activity bit (RAB) should be set to one or zero.

After the maximum effective noise power spectral density ($N_{t,max,effective}$) is determined, the RAB is either set, meaning that the RAB is set to one, or unset, meaning that the RAB is set to zero, depending upon whether $N_{t,max,effective}$ is greater than a predetermined threshold, as indicated by block 54 in FIG. 2. If $N_{t,max,effective}$ is greater than the predetermined threshold, then the RAB is set to one to signal all of the access terminals which are power controlled by the sector to lower their data rates to control the sector loading in order to minimize interference among the access terminals. If $N_{t,max,effective}$ is less than the predetermined threshold, then the RAB is unset, that is, set to zero, to indicate to all of the access terminals that are power controlled by the sector that they need not reduce their data rates in order to control the sector loading. In an embodiment, the ratio of the maximum effective noise power spectral density to the thermal noise power spectral density ($N_{t,max,effective}/N_0$) is compared to a predetermined threshold to determine whether the RAB should be set or unset.

In an embodiment, only the effective noise power spectral densities of the access terminals which contribute a significant load to the sector are considered, while the access terminals which do not contribute or only contribute negligibly to the sector's loading are ignored in the determination of whether the RAB should be set or unset. In an embodiment, only those access terminals which include the given sector of the base station in their active sets are selected for consideration. The filtered ratio of pilot chip energy to the effective noise power spectral density ($E_{cp}/N_t$) per antenna for each of the access terminals under consideration is computed in a manner known to a person skilled in the art. The filtered ratio ($E_{cp}/N_t$) per antenna for each of these access terminals is then compared to a predetermined setpoint. If the filtered ratio ($E_{cp}/N_t$) per antenna for a particular access terminal is below the predetermined setpoint by more than a predetermined offset, for example, 2 dB, then the access terminal is deemed irrelevant to the sector's loading and therefore ignored in the determination of whether the RAB should be set or unset.

Alternatively, the determination of whether an access terminal contributes a significant load to the sector can be based on whether the data request channel lock (DRCLock) of the access terminal is set or unset. The data request channel (DRC) is a reverse link channel known to a person skilled in the art of CDMA communications. If the DRCLock of an access terminal is unset, then the access terminal may be deemed irrelevant to the sector's loading and therefore ignored in the determination of whether the RAB should be set or unset.

In another alternative, the determination of whether an access terminal contributes a significant load to the sector may be based on filtered reverse link path loss from the access terminal to the base station. For example, the transmit power of the access terminal may be communicated to the base station through one of the reverse link channels, and the received power at the base station can be measured directly by the base station itself. The filtered path loss for the reverse link from the access terminal to the base station can be calculated in a manner known to a person skilled in the art. The filtered path loss is then compared to a predetermined threshold. If the filtered path loss is above the predetermined threshold, the access terminal is deemed irrelevant to the sector's loading and therefore ignored in the determination of whether the RAB should be set or unset.

In an embodiment, an upper threshold of the rise-over-thermal (ROT) ratio ($I_0/N_0$), which is conventionally defined as the ratio of total received power spectral density ($I_0$) to thermal noise power spectral density ($N_0$), is imposed on the sector in order to avoid the overloading of neighboring sectors. If the ROT ratio is greater than a predetermined threshold, the RAB is set to one to signal all of the access terminals that are power controlled by the sector to lower their data rates regardless of whether the parameter $N_{t,max,effective}/N_0$ is large enough to trigger the setting of the RAB.

In an embodiment, if only one access terminal that is power controlled by the sector is active, the RAB is unset, that is, set to zero, such that the access terminal need not reduce its data rate as long as the ROT ratio is below the predetermined threshold to avoid overloading the neighboring sectors.

Figure 3:
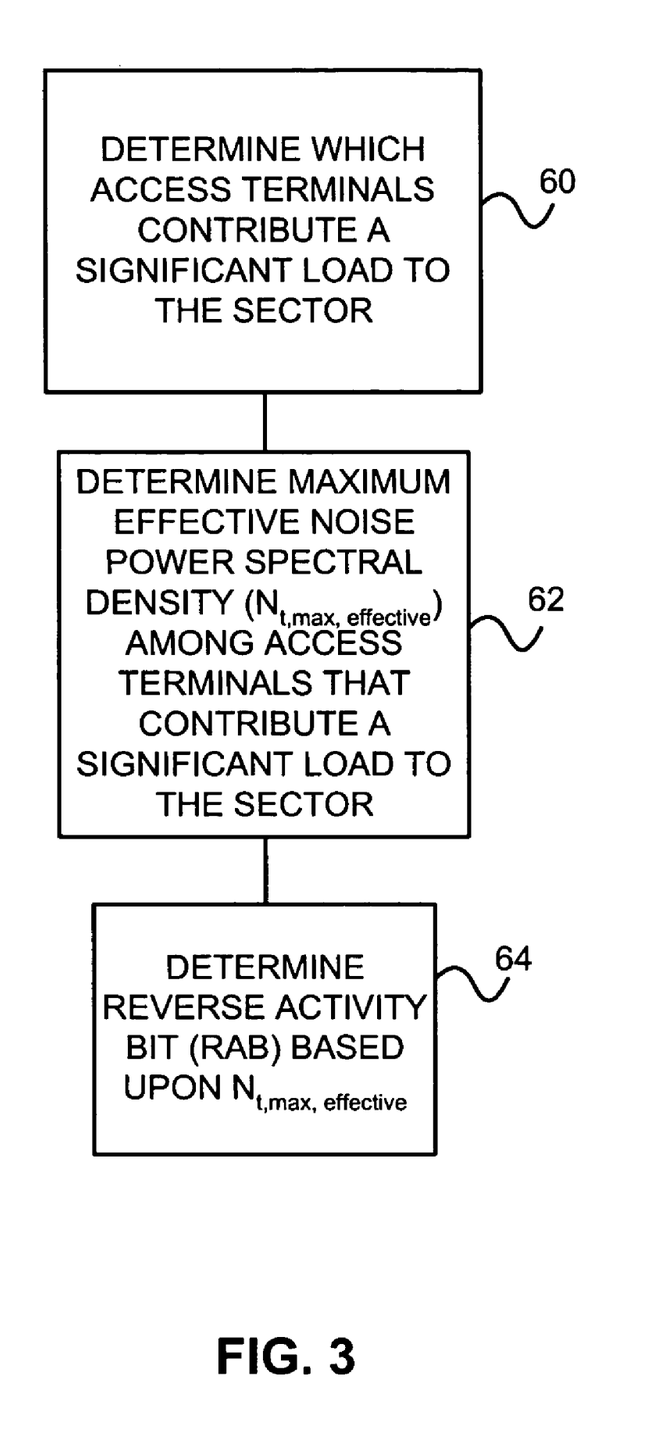
FIG. 3 is a flowchart illustrating another embodiment of process steps in a method for setting a reverse activity bit (RAB) to signal access terminals to change their data rates to control interference according to the present invention.

FIG. 3 is a flowchart illustrating another embodiment of the process of determining the RAB to signal the access terminals to change their reverse link data rates to control interference among the access terminals. As illustrated in FIG. 3, an initial determination is made as to which access terminals contribute a significant load to the sector as indicated by block 60. Subsequently, the maximum effective noise power spectral density ($N_{t,max,effective}$) is determined among the access terminals that are deemed to contribute a significant load to the sector as indicated by block 62. In an embodiment, the ratio of the maximum effective noise power spectral density to the thermal noise power spectral density ($N_{t,max,effective}/N_0$) is computed and used as a parameter for determining whether the base station should signal the access terminals that are power controlled by the sector to reduce their data rates in order to control the loading of the sector.

After the maximum effective noise power spectral density ($N_{t,max,effective}$) is determined, the RAB is either set, meaning that the RAB is set to one, or unset, meaning that the RAB is set to zero, depending upon whether $N_{t,max,effective}$ is greater than a predetermined threshold, as indicated by block 64 in FIG. 3. If $N_{t,max,effective}$ is greater than the predetermined threshold, then the RAB is set to one to signal all of the access terminals that are power controlled by the sector to lower their data rates in order to control interference between the access terminals. If $N_{t,max,effective}$ is less than the predetermined threshold, then the RAB is unset, that is, set to zero, to indicate to all of the access terminals that are power controlled by the sector that they need not reduce their data rates in order to control interference between the access terminals. In an embodiment, the ratio of the maximum effective noise power spectral density to the thermal noise power spectral density ($N_{t,max,effective}/N_0$) is compared to a predetermined threshold to determine whether the RAB should be set or unset.

In an embodiment, only those access terminals which include the given sector of the base station in their active sets are selected for consideration as potentially relevant access terminals which may contribute significantly to the sector's loading. The filtered ratio of pilot chip energy to the effective noise power spectral density ($E_{cp}/N_t$) per antenna for each of the access terminals under consideration is computed in a manner known to a person skilled in the art. The filtered ratio ($E_{cp}/N_t$) per antenna for each of the access terminals is then compared to a predetermined setpoint. If the filtered ratio ($E_{cp}/N_t$) per antenna for a particular access terminal is below the predetermined setpoint by more than a predetermined offset, for example, 2 dB, then the access terminal is deemed irrelevant to the sector's loading and therefore ignored in the determination of whether the RAB should be set or unset.

Alternatively, the determination of whether an access terminal contributes a significant load to the sector can be based on whether the data request channel lock (DRCLock) of the access terminal is set or unset. If the DRCLock of an access terminal is unset, then the access terminal may be deemed irrelevant to the sector's loading and therefore ignored in the determination of whether the RAB should be set or unset.

In another alternative, the determination of whether an access terminal contributes a significant load to the sector may be based on a comparison of the filtered reverse link path loss from the access terminal to the base station to a predetermined threshold. If the filtered path loss is above the predetermined threshold, then the access terminal is deemed irrelevant to the sector's loading and therefore ignored in the determination of whether the RAB should be set or unset.

In an embodiment, an upper threshold of the rise-over-thermal (ROT) ratio ($I_0/N_0$) is imposed on the sector in order to avoid the overloading of neighboring sectors. If the ROT ratio is greater than a predetermined threshold, the RAB is set to one to signal all of the access terminals that are power controlled by the sector to lower their data rates regardless of whether the $N_{t,max,effective}/N_0$ is large enough to trigger the setting of the RAB.

In an embodiment, if only one access terminal that is power controlled by the sector is active, the RAB is unset or set to zero, such that the access terminal need not reduce its data rate as long as the ROT ratio is below the predetermined threshold to avoid overloading the neighboring sectors.

Various embodiments of the apparatus and method according to the present invention may be implemented in CDMA communication systems as alternatives to the conventional scheme of ROT-based RAB setting to control sector loading with a miniscule amount of additional complexity. Gains in the data throughput of each sector of a base station may be realized while avoiding interference between the access terminals.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect," "connected to" and "connection" used in describing a relationship between different elements do not imply that a direct physical connection must be made between these elements. For example, two elements may be connected to each other physically, electronically, logically, or in any other manner, through one or more additional elements, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, photons, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), erasable programmable read-only memory (EPROM), electrically erasable programmable read-only memory (EEPROM), registers, a hard disk, a removable disk, a CD-ROM, or any other form of storage medium known in the art. An exemplary storage medium is coupled to the processor such the processor can read information from, and write information to, the storage medium. In an alternative, the storage medium may be integral to the processor. The processor and the storage medium may reside in an ASIC. The ASIC may reside in any part of a communication system, for example, a base station, a base station controller, or an access terminal. In another alternative, the processor and the storage medium may reside as discrete components in any part of the communication system.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of directing access terminals that are power controlled by a sector of a base station to change data rates in reverse link communications from the access terminals to the base station, the method comprising:

determining an effective noise power spectral density ($N_{t,i,effective}$) at an access network for one of the access terminals (i) due to a thermal noise power spectral density ($N_0$) and a sum of chip energy of ($E_c$) of all channels except pilot channels of at least some of the access terminals that are power controlled by the sector, wherein the chip energy of the channels of the access terminal for which the effective noise power spectral density ($N_{t,i,effective}$) is determined is not used in determining the effective noise power spectral density ($N_{t,i,effective}$);

determining a maximum effective noise power spectral density ($N_{t,max,effective}$) among the access terminals; and determining a reverse activity bit (RAB) to signal all of the access terminals that are power controlled by the sector to change the data rates based upon the maximum effective noise power spectral density.

2. The method of claim 1, further comprising the step of determining whether any of the access terminals contributes a significant load to the sector.

3. The method of claim 2, wherein the step of determining whether any of the access terminals contributes a significant load to the sector comprises the step of determining whether the sector is included in an active set by the access terminal.

4. The method of claim 3, wherein the step of determining whether any of the access terminals contributes a significant load to the sector further comprises the step of computing a filtered ratio of pilot chip energy to the effective noise power spectral density ($E_{cp}/N_t$) per antenna for the access terminal.

5. The method of claim 4, wherein the step of determining whether any of the access terminals contributes a significant load to the sector further comprises the steps of:
determining whether the $E_{cp}/N_t$ per antenna of the access terminal is below a predetermined setpoint by more than a predetermined offset; and
ignoring the access terminal if the $E_{cp}/N_t$ per antenna of the access terminal is below the predetermined setpoint by more than the predetermined offset.

6. The method of claim 1, wherein the step of determining a maximum effective noise power spectral density ($N_{t,max,effective}$) comprises the step of computing a ratio of the maximum effective noise power spectral density to a thermal noise power spectral density ($N_{t,max,effective}/N_0$).

7. The method of claim 6, wherein the step of determining a reverse activity bit (RAB) to signal all of the access terminals that are power controlled by the sector to change the data rates comprises the step of setting the RAB to 1 if the $N_{t,max,effective}/N_0$ is greater than a predetermined $N_{t,max,effective}/N_0$ threshold.

8. The method of claim 1, wherein the step of determining a reverse activity bit (RAB) to signal all of the access terminals that are power controlled by the sector to change the data rates comprises the step of setting the RAB to 1 if a rise-over-thermal (ROT) ratio is greater than a predetermined ROT threshold regardless of whether the $N_{t,max,effective}/N_0$ is greater than a predetermined $N_{t,max,effective}/N_0$ threshold.

9. The method of claim 1, further comprising the steps of:
determining whether only one access terminal that is power controlled by the sector is active; and
setting the RAB to 0 if only one access terminal that is power controlled by the sector is active and a rise-over-thermal (ROT) ratio is less than a predetermined ROT threshold.

10. A method of directing access terminals that are power controlled by a sector of a base station to change data rates in reverse link communications from the access terminals to the base station, the method comprising:
determining whether any of the access terminals contributes a significant load to the sector;
determining a noise power spectral density ($N_{t,i}$) at an access terminal (i), wherein chip energy of the channels of the access terminal (i) is not used in determining the noise power spectral density ($N_{t,i}$);
determining a maximum noise power spectral density ($N_{t,max}$) among the access terminals that contribute a significant, load to the sector;
computing a ratio of the maximum noise power spectral density to a thermal noise power spectral density ($N_{t,max}/N_0$); and
determining a reverse activity bit (RAB) to signal all of the access terminals that are power controlled by the sector to change the data rates based upon the maximum noise power spectral density.

11. The method of claim 10, wherein the step of determining whether any of the access terminals contributes a significant load to the sector comprises the step of determining whether the sector is included in an active set by the access terminal.

12. The method of claim 11, wherein the step of determining whether any of the access terminals contributes a significant load to the sector further comprises the step of computing a filtered ratio of pilot chip energy to an effective noise power spectral density ($E_{cp}/N_t$) per antenna for the access terminal.

13. The method of claim 12, wherein the step of determining whether any of the access terminals contributes a significant load to the sector further comprises the steps of:
determining whether the $E_{cp}/N_t$ per antenna of the access terminal is below a predetermined setpoint by more than a predetermined offset; and
ignoring the access terminal if the $E_{cp}/N_t$ per antenna of the access terminal is below the predetermined setpoint by more than the predetermined offset.

14. The method of claim 10, wherein the step of determining whether any of the access terminals contributes a significant load to the sector comprises the steps of:
determining whether a data request channel lock (DRCLock) of the access terminal is unset; and
ignoring the access terminal if the DRCLock of the access terminal is unset.

15. The method of claim 10, wherein the step of determining whether any of the access terminals contributes a significant load to the sector comprises the steps of:
determining whether a filtered path loss from the access terminal to the base station is above a predetermined threshold; and
ignoring the access terminal if the filtered path loss from the access terminal to the base station is above the predetermined threshold.

16. The method of claim 10, wherein the step of determining a maximum noise power spectral density ($N_{t,max}$) comprises the steps of:
determining a minimum chip energy ($E_{c,min}$) among the access terminals that contribute a significant load to the sector;
determining a total received power spectral density ($I_0$) at the base station; and
computing the maximum noise power spectral density by subtracting $E_{c,min}$ from $I_0$.

17. The method of claim 10, wherein the step of determining a reverse activity bit (RAB) to signal all of the access terminals that are power controlled by the sector to change the data rates comprises the step of setting the RAB to 1 if the $N_{t,max}/N_0$ is greater than a predetermined threshold.

18. The method of claim 10, wherein the step of determining a reverse activity bit (RAB) to signal all of the access terminals that are power controlled by the sector to change the data rates comprises the step of setting the RAB to 1 if a rise-over-thermal (ROT) ratio is greater than a predetermined threshold.

19. The method of claim 10, further comprising the steps of:
determining whether only one access terminal that is power controlled by the sector is active; and
setting the RAB to 0 if only one access terminal that is power controlled by the sector is active.

20. A base station apparatus, comprising:
means for determining an effective noise power spectral density ($N_{t,i,effective}$) for one of the access terminals (i) due to a thermal noise power spectral density ($N_0$) and a sum of chip energy of ($E_c$) of all channels except pilot channels of at least some of the access terminals that are power controlled by a sector of the base station, wherein the chip energy of the channels of the access terminal for which the effective noise power spectral density is determined is not used in determining the effective noise power spectral density;

means for determining a maximum effective noise power spectral density ($N_{t,max,effective}$) among the access terminals; and means for determining a reverse activity bit (RAB) to signal all of the access terminals that are power controlled by the sector to change data rates based upon the maximum effective noise power spectral density.

21. The apparatus of claim 20, further comprising means for determining whether any of the access terminals contributes a significant load to the sector.

22. The apparatus of claim 21, wherein the means for determining whether any of the access terminals contributes a significant load to the sector comprises means for determining whether the sector is included in an active set by the access terminal.

23. The apparatus of claim 22, wherein the means for determining whether any of the access terminals contributes a significant load to the sector further comprises means for computing a filtered ratio of pilot chip energy to the effective noise power spectral density ($E_{cp}/N_t$) per antenna for the access terminal.

24. The apparatus of claim 23, wherein the means for determining whether any of the access terminals contributes a significant load to the sector further comprises:
means for determining whether the $E_{cp}/N_t$ per antenna of the access terminal is below a predetermined setpoint by more than a predetermined offset; and
means for ignoring the access terminal if the $E_{cp}/N_t$ per antenna of the access terminal is below the predetermined setpoint by more than the predetermined offset.

25. The apparatus of claim 20, wherein the means for determining a maximum effective noise power spectral density ($N_{t,max,effective}$) comprises means for computing a ratio of the maximum effective noise power spectral density to a thermal noise power spectral density ($N_{t,max,effective}/N_0$).

26. The apparatus of claim 25, wherein the means for determining a reverse activity bit (RAB) to signal all of the access terminals that are power controlled by the sector to change data rates comprises means for setting the RAB to 1 if the $N_{t,max,effective}/N_0$ is greater than a predetermined $N_{t,max,effective}/N_0$ threshold.

27. The apparatus of claim 20, wherein the means for determining a reverse activity bit (RAB) to signal all of the access terminals that are power controlled by the sector to change data rates comprises means for setting the RAB to 1 if a rise-over-thermal (ROT) ratio is greater than a predetermined ROT threshold regardless of whether the $N_{t,max,effective}/N_0$ is greater than a predetermined $N_{t,max,effective}/N_0$ threshold.

28. The apparatus of claim 20, further comprising:
means for determining whether only one access terminal that is power controlled by the sector is active; and
means for setting the RAB to 0 if only one access terminal that is power controlled by the sector is active and a rise-over-thermal (ROT) ratio is less than a predetermined ROT threshold.

29. A base station apparatus, comprising:
means for determining whether any of a plurality of access terminals contributes a significant load to a given sector of the base station;
means for determining a noise power spectral density ($N_{t,i}$) at an access terminal (i), wherein chip energy of the channels of the access terminal (i) is not used in determining the noise power spectral density ($N_{t,i}$);

means for determining a maximum noise power spectral density ($N_{t,max}$) among the access terminals that contribute a significant load to the sector;

means for computing a ratio of the maximum noise power spectral density to a thermal noise power spectral density ($N_{t,max}/N_0$); and means for determining a reverse activity bit (RAB) to signal all of the access terminals that are power controlled by the sector to change data rates based upon the maximum noise power spectral density.

30. The apparatus of claim 29, wherein the means for determining whether any of the access terminals contributes a significant load to the sector comprises means for determining whether the sector is included in an active set by the access terminal.

31. The apparatus of claim 30, wherein the means for determining whether any of the access terminals contributes a significant load to the sector further comprises means for computing a filtered ratio of pilot chip energy to an effective noise power spectral density ($E_{cp}/N_t$) per antenna for the access terminal.

32. The apparatus of claim 31, wherein the means for determining whether any of the access terminals contributes a significant load to the sector further comprises:
means for determining whether the $E_{cp}/N_t$ per antenna of the access terminal is below a predetermined setpoint by more than a predetermined offset; and
means for ignoring the access terminal if the $E_{cp}/N_t$ per antenna of the access terminal is below the predetermined setpoint by more than the predetermined offset.

33. The apparatus of claim 29, wherein the means for determining whether any of the access terminals contributes a significant load to the sector comprises:
means for determining whether a data request channel lock (DRCLock) of the access terminal is unset; and
means for ignoring the access terminal if the DRCLock of the access terminal is unset.

34. The apparatus of claim 29, wherein the means for determining whether any of the access terminals contributes a significant load to the sector comprises:
means for determining whether a filtered path loss from the access terminal to the base station is above a predetermined threshold; and
means for ignoring the access terminal if the filtered path loss from the access terminal to the base station is above the predetermined threshold.

35. The apparatus of claim 29, wherein the means for determining a maximum noise power spectral density ($N_{t,max}$) comprises:
means for determining a minimum chip energy ($E_{c,min}$) among the access terminals that contribute a significant load to the sector;
means for determining a total received power spectral density ($I_0$) at the base station; and
means for computing the maximum noise power spectral density by subtracting $E_{c,min}$ from $I_0$.

36. The apparatus of claim 29, wherein the means for determining a reverse activity bit (RAB) to signal all of the access terminals that are power controlled by the sector to change data rates comprises means for setting the RAB to 1 if the $N_{t,max}/N_0$ is greater than a predetermined threshold.

37. The apparatus of claim 29, wherein the means for determining a reverse activity bit (RAB) to signal all of the access terminals that are power controlled by the sector to change data rates comprises means for setting the RAB to 1 if a rise-over-thermal (ROT) ratio is greater than a predetermined threshold.

38. The apparatus of claim 29, further comprising:
means for determining whether only one access terminal that is power controlled by the sector is active; and
means for setting the RAB to 0 if only one access terminal that is power controlled by the sector is active.

39. A computer readable medium containing computer executable instructions embodying a method of directing access terminals that are power controlled by a sector of a base station to change data rates in reverse link communications from the access terminals to the base station, the method comprising:
determining an effective noise power spectral density ($N_{t,i,effective}$) at an access network for one of the access terminals (i) due to a thermal noise power spectral density ($N_0$) and a sum of chip energy of ($E_c$) of all channels except pilot channels of at least some of the access terminals that are power controlled by the sector, wherein the chip energy of the channels of the access terminal for which the effective noise power spectral density ($N_{t,i,effective}$) is determined is not used in determining the effective noise power spectral density ($N_{t,i,effective}$);
determining a maximum effective noise power spectral density ($N_{t,max,effective}$) among the access terminals; and
determining a reverse activity bit (RAB) to signal all of the access terminals that are power controlled by the sector to change the data rates based upon the maximum effective noise power spectral density.

40. The computer readable medium of claim 39, wherein the method further comprises the step of determining whether any of the access terminals contributes a significant load to the sector.

41. The computer readable medium of claim 40, wherein the step of determining whether any of the access terminals contributes a significant load to the sector comprises the step of determining whether the sector is included in an active set by the access terminal.

42. The computer readable medium of claim 41, wherein the step of determining whether any of the access terminals contributes a significant load to the sector further comprises the step of computing a filtered ratio of pilot chip energy to the effective noise power spectral density ($E_{cp}/N_t$) per antenna for the access terminal.

43. The computer readable medium of claim 42, wherein the step of determining whether any of the access terminals contributes a significant load to the sector further comprises the steps of:
determining whether the $E_{cp/Nt}$ per antenna of the access terminal is below a predetermined setpoint by more than a predetermined offset; and
ignoring the access terminal if the $E_{cp}/N_t$ per antenna of the access terminal is below the predetermined setpoint by more than the predetermined offset.

44. The computer readable medium of claim 39, wherein the step of determining a maximum effective noise power spectral density ($N_{t,max,effective}$) comprises the step of computing a ratio of the maximum effective noise power spectral density to a thermal noise power spectral density ($N_{t,max,}/N_0$).

45. The computer readable medium of claim 44, wherein the step of determining a reverse activity bit (RAB) to signal all of the access terminals that are power controlled by the sector to change the data rates comprises the step of setting the RAB to 1 if the $N_{t,max,effective}/N_0$ is greater than a predetermined $N_{t,max,effective}/N_0$ threshold.

46. The computer readable medium of claim 39, wherein the step of determining a reverse activity bit (RAB) to signal all of the access terminals that are power controlled by the sector to change the data rates comprises the step of setting the RAB to 1 if a rise-over-thermal (ROT) ratio is greater than a predetermined ROT threshold regardless of whether the $N_{t,max,effective}/N_0$ is greater than a predetermined $N_{t,max,effective}/N_0$ threshold.

47. The computer readable medium of claim 39, wherein the method further comprises the steps of:
determining whether only one access terminal that is power controlled by the sector is active; and
setting the RAB to 0 if only one access terminal that is power controlled by the sector is active and a rise-over-thermal (ROT) ratio is less than a predetermined ROT threshold.

48. A computer readable medium containing computer executable instructions embodying a method of directing access terminals that are power controlled by a sector of a base station to change data rates in reverse link communications from the access terminals to the base station, the method comprising:
determining whether any of the access terminals contributes a significant load to the sector;
determining a noise power spectral density ($N_{t,i}$) at an access terminal (i), wherein chip energy of the channels of the access terminal (i) is not used in determining the noise power spectral density ($N_{t,i}$);
determining a maximum noise power spectral density ($N_{t,max}$) among the access terminals that contribute a significant load to the sector;
computing a ratio of the maximum noise power spectral density to a thermal noise power spectral density ($N_{t,max}/N_0$); and
determining a reverse activity bit (RAB) to signal all of the access terminals that are power controlled by the sector to change the data rates based upon the maximum noise power spectral density.

49. The computer readable medium of claim 48, wherein the step of determining whether any of the access terminals contributes a significant load to the sector comprises the step of determining whether the sector is included in an active set by the access terminal.

50. The computer readable medium of claim 49, wherein the step of determining whether any of the access terminals contributes a significant load to the sector further comprises the step of computing a filtered ratio of pilot chip energy to an effective noise power spectral density ($E_{cp}/N_t$) per antenna for the access terminal.

51. The computer readable medium of claim 50, wherein the step of determining whether any of the access terminals contributes a significant load to the sector further comprises the steps of:
determining whether the $E_{cp}/N_t$ per antenna of the access terminal is below a predetermined setpoint by more than a predetermined offset; and
ignoring the access terminal if the $E_{cp}/N_t$ per antenna of the access terminal is below the predetermined setpoint by more than the predetermined offset.

52. The computer readable medium of claim 48, wherein the step of determining whether any of the access terminals contributes a significant load to the sector comprises the steps of:
determining whether a data request channel lock (DRCLock) of the access terminal is unset; and
ignoring the access terminal if the DRCLock of the access terminal is unset.

53. The computer readable medium of claim 48, wherein the step of determining whether any of the access terminals contributes a significant load to the sector comprises the steps of:
- determining whether a filtered path loss from the access terminal to the base station is above a predetermined threshold; and
- ignoring the access terminal if the filtered path loss from the access terminal to the base station is above the predetermined threshold.

54. The computer readable medium of claim 48, wherein the step of determining a maximum noise power spectral density ($N_{t,max}$) comprises the steps of:
- determining a minimum chip energy ($E_{c,min}$) among the access terminals that contribute a significant load to the sector;
- determining a total received power spectral density ($I_0$) at the base station; and
- computing the maximum noise power spectral density by subtracting $E_{c,min}$ from $I_0$.

55. The computer readable medium of claim 48, wherein the step of determining a reverse activity bit (RAB) to signal all of the access terminals that are power controlled by the sector to change the data rates comprises the step of setting the RAB to 1 if the $N_{t,max}/N_0$ is greater than a predetermined threshold.

56. The computer readable medium of claim 48, wherein the step of determining a reverse activity bit (RAB) to signal all of the access terminals that are power controlled by the sector to change the data rates comprises the step of setting the RAB to 1 if a rise-over-thermal (ROT) ratio is greater than a predetermined threshold.

57. The computer readable medium of claim 48, wherein the method further comprises the steps of:
- determining whether only one access terminal that is power controlled by the sector is active; and
- setting the RAB to 0 if only one access terminal that is power controlled by the sector is active.

* * * * *

UNITED STATES PATENT AND TRADEMARK OFFICE
CERTIFICATE OF CORRECTION

PATENT NO. : 7,668,561 B2
APPLICATION NO. : 10/789516
DATED : February 23, 2010
INVENTOR(S) : Au et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 720 days.

Signed and Sealed this

Fourth Day of January, 2011

David J. Kappos
*Director of the United States Patent and Trademark Office*